(12) United States Patent
Kolokotronis

(10) Patent No.: US 10,098,013 B2
(45) Date of Patent: Oct. 9, 2018

(54) DYNAMIC AZIMUTH ADJUSTMENT FOR CELLULAR REPEATER ANTENNA SYSTEMS

(71) Applicant: Dimitris Kolokotronis, Kypseli (GR)

(72) Inventor: Dimitris Kolokotronis, Kypseli (GR)

(*) Notice: Subject to any disclaimer, the term of this patent is extended or adjusted under 35 U.S.C. 154(b) by 0 days.

(21) Appl. No.: 15/529,600

(22) PCT Filed: Dec. 1, 2015

(86) PCT No.: PCT/EP2015/078184
§ 371 (c)(1),
(2) Date: May 25, 2017

(87) PCT Pub. No.: WO2016/087431
PCT Pub. Date: Jun. 9, 2016

(65) Prior Publication Data
US 2017/0265087 A1    Sep. 14, 2017

(30) Foreign Application Priority Data

Dec. 2, 2014  (GB) .................................. 1421388.8

(51) Int. Cl.
*H04B 7/15*     (2006.01)
*H04W 16/28*    (2009.01)
(Continued)

(52) U.S. Cl.
CPC .............. *H04W 16/28* (2013.01); *H01Q 1/34* (2013.01); *H01Q 25/04* (2013.01);
(Continued)

(58) Field of Classification Search
CPC ........ H01Q 1/34; H01Q 25/04; H04B 7/0602; H04W 16/26; H04W 16/28; H04W 88/04
(Continued)

(56) References Cited

U.S. PATENT DOCUMENTS 4,794,649 A * 12/1988 Fujiwara ................ H04B 7/155
                                                     340/7.36
6,445,904 B1 * 9/2002 Lovinggood .......... H01Q 1/007
                                                     455/11.1
(Continued)

FOREIGN PATENT DOCUMENTS

EP         1333596        8/2003

OTHER PUBLICATIONS

Search Report and Written Opinion issued in Int'l App. No. PCT/EP2015/0781 (dated 2016).

*Primary Examiner* — Tan H Trinh
(74) *Attorney, Agent, or Firm* — Reichel Stohry LLP; Natalie J. Dean; Mark C. Reichel

(57) ABSTRACT

A mobile vehicle repeater antenna system, comprising: a scanning antenna system comprising one or more scanning antennas, wherein the one or more scanning antennas are configured to receive, for at least a first azimuth heading value and a second azimuth heading value, data comprising mobile communication signal and network parameters, a donor antenna system comprising one or more antennas, wherein the one or more antennas are configured to receive and transmit mobile communication signals, a controller connected to the scanning antenna system and the donor antenna system, wherein the controller is configured to compare the received data for the at least first azimuth heading value and the second azimuth heading value; determine whether the first azimuth heading value or the second azimuth heading value provides optimal network and signal parameters according to predefined criteria; and control operation of the one or more antennas of the donor antenna system in accordance with the determination.

25 Claims, 3 Drawing Sheets

(51) Int. Cl.
  *H04B 7/06* (2006.01)
  *H04W 16/26* (2009.01)
  *H01Q 1/34* (2006.01)
  *H01Q 25/04* (2006.01)
  *H04W 88/04* (2009.01)

(52) U.S. Cl.
  CPC .......... *H04B 7/0602* (2013.01); *H04W 16/26* (2013.01); *H04W 88/04* (2013.01)

(58) Field of Classification Search
  USPC ........ 455/7, 11.1, 15, 10, 276.1, 562.1, 522, 455/69, 273, 429, 12.1, 435.2, 13.1, 435; 240/908, 909; 370/315
  See application file for complete search history.

(56) References Cited

U.S. PATENT DOCUMENTS

| | | | | |
|---|---|---|---|---|
| 7,123,911 B1* | 10/2006 | Ngan | ................. | H04B 7/15535 455/11.1 |
| 2002/0032031 A1* | 3/2002 | Ogino | .................... | H04B 7/155 455/435.1 |
| 2002/0045461 A1* | 4/2002 | Bongfeldt | .......... | H04B 7/15535 455/522 |
| 2003/0048770 A1 | 3/2003 | Proctor, Jr. | | |
| 2004/0110469 A1* | 6/2004 | Judd | ....................... | G01S 19/25 455/15 |
| 2004/0166802 A1* | 8/2004 | McKay, Sr. | ........ | H04B 7/15535 455/15 |
| 2005/0075139 A1 | 4/2005 | Shapira | | |
| 2005/0285784 A1* | 12/2005 | Chiang | .................... | H01Q 3/24 342/359 |
| 2006/0035588 A1* | 2/2006 | Chapelle | ............. | H04B 7/18508 455/13.3 |
| 2006/0205342 A1* | 9/2006 | McKay, Sr. | .............. | H04B 3/36 455/11.1 |
| 2006/0229104 A1* | 10/2006 | de La Chapelle | .......................... | H04B 7/18506 455/562.1 |
| 2007/0010198 A1* | 1/2007 | McKay, Sr. | .............. | H04B 7/10 455/10 |
| 2007/0232228 A1* | 10/2007 | McKay, Sr. | .......... | H04B 7/1555 455/11.1 |
| 2008/0039012 A1* | 2/2008 | McKay | ................ | H04B 7/1555 455/11.1 |
| 2008/0261519 A1* | 10/2008 | DeMarco | ................ | H04B 1/525 455/7 |
| 2010/0026520 A1* | 2/2010 | Witte | ....................... | G08G 1/07 340/908 |
| 2010/0075595 A1* | 3/2010 | DeMarco | ................ | H04B 1/525 455/11.1 |
| 2010/0297937 A1* | 11/2010 | Kim | ..................... | H04B 7/1555 455/11.1 |
| 2012/0309293 A1* | 12/2012 | Kummetz | .......... | H04B 7/15528 455/11.1 |
| 2016/0269917 A1* | 9/2016 | Hillegas, Jr. | ........... | H04W 24/02 |

* cited by examiner

US 10,098,013 B2

DYNAMIC AZIMUTH ADJUSTMENT FOR CELLULAR REPEATER ANTENNA SYSTEMS

CROSS REFERENCE TO RELATED APPLICATIONS

This application is a U.S. nationalization under 35 U.S.C. § 371 of International Application No. PCT/EP2015/078184, filed Dec. 1, 2015, which claims priority to United Kingdom Patent Application No. 1421388.8, filed Dec. 2, 2014. The disclosures set forth in the referenced applications are incorporated herein by reference in their entireties.

FIELD OF THE INVENTION

This invention relates to cellular repeater antenna systems, and, more specifically, to cellular repeater systems for moving vehicles.

BACKGROUND OF THE INVENTION

Cellular reception in or on moving vehicles such as cars, buses, trams, train and ships is often poor because the vehicles are moving through areas which are served by different transmission installations and because the vehicles are predominantly metallic structures which act as Faraday cages and therefore further attenuate cellular signals.

Moving vessels at sea encounter weak reception of mobile communication signals because, in addition to the above, base station antennas are primarily planned, positioned and installed on land in order to serve mainland hotspots. The sea routes along which vessels travel are not usually located in main radiation areas of base station antennas and are generally a long distance away from cellular towers, resulting in significant pathloss.

In order to address weak or poor reception, cellular repeater systems are often used. A cellular repeater (also known as cell phone signal booster or amplifier), is a system used for boosting the cell phone reception in confined or remote areas such as buildings, tunnels, ships and the like. Cellular repeater systems generally comprise three main functional units: a donor external antenna, a signal bi-directional amplifier, and an internal rebroadcast antenna or distributed antenna system.

Due to the translational movement of a vessel along a sea route, the cellular tower providing the best signal for use by the vessel will change; indeed, the direction from which the best serving donor signal is received may be at any azimuth direction—i.e. anywhere 360° around the vessel's horizon. Omnidirectional antennas radiate power uniformly in all directions in one plane, and are therefore selected for in-ship cellular repeater applications. However, omnidirectional donor antennas have extremely low gain (usually 0 dBi compared to the significantly higher gain offered by a typical directional antenna) as a result of the received power based on very low radio link budget between the donor cellular tower and the cellular repeater system (the radio link budget accounts for all of the gains and losses between the transmitter and the receiver). This affects the effectiveness and efficiency of such cellular repeater systems.

It is an aim of the present invention to mitigate at least some of the above mentioned drawbacks of the prior art.

SUMMARY OF THE INVENTION

According to a first aspect of the invention, there is provided a repeater antenna system for a vessel, comprising: a scanning antenna system comprising one or more scanning antennas, wherein the one or more scanning antennas are configured to receive, for at least a first azimuth heading value and a second azimuth heading value, data comprising mobile communication signal and network parameters, a donor antenna system comprising one or more antennas, wherein the one or more antennas are configured to receive and transmit mobile communication signals, a controller connected to the scanning antenna system and the donor antenna system, wherein the controller is configured to compare the received data for the at least first azimuth heading value and the second azimuth heading value; determine which of the data received for the first azimuth heading value or the second azimuth heading satisfy predefined criteria; and control operation of the one or more antennas of the donor antenna system in accordance with the determination.

Preferably, the donor antenna system and the scanning antenna system comprises a multi directional antenna system comprising two or more directional antennas.

Preferably, the first azimuth heading value and the second azimuth heading value are, respectively, heading values of two of the two or more directional antennas of the multi directional antenna system.

Optionally, the donor and scanning multi directional antenna systems each comprise first, second and third antennas, and wherein the main beam of the first, second and third antenna is positioned at 120, 240 and 360 degrees on the azimuth plane.

The donor antenna system and the scanning antenna system may be comprised in a dual polarisation antenna system, which preferably comprises two or more antennas, wherein each antenna has a first and second polarisation, wherein the first polarisation of the antenna operates as a scanning antenna and the second polarisation operates as a donor antenna.

More preferably, the dual-polarization antenna system is configured to operate as a multi-band, multi-frequency or broadband antenna system. Even more preferably, the dual-polarization antenna system deploys one directional antenna connector per polarization and per radio access technology (RAN) operating band.

Preferably, the first azimuth heading value and the second azimuth heading value are, respectively, heading values of two of the two or more antennas of the dual polarisation antenna system. Preferably, the dual polarisation antenna system comprises first, second and third antennas, and wherein the main beam of the first, second and third antenna is positioned at 120, 240 and 360 degrees on the azimuth plane.

Optionally, the controller comprises a timer and the scanning antenna system comprises a RF power switch, wherein operation of the RF power switch of the scanning antenna system is synchronised with the timer of the controller. The controller is preferably further configured to control the scanning antenna system to collect data by sequencing operation of its directional antennas, wherein the sequenced operation of the antennas is controlling the RF power switch.

Preferably, the sequencing pattern dictates the length of the time periods during which data is collected for each antenna of the scanning multi directional antenna system. The time periods for collecting data are preferably equal adequate for each antenna in the scanning antenna system.

The controller is preferably configured to determine, based on the network and signal parameters received by each scanning antenna during a complete scanning sequence, which directional antenna of the donor antenna system is to be operational during the next scanning sequence.

Optionally, each of the one or more scanning antennas are concurrently operational and collecting data, and preferably the controller periodically compares the data received from all of the one or more scanning antennas.

Optionally, the donor antenna system further comprises a bi-directional amplifier connected to each of the one or more directional antennas and one or more internal panel antennas.

An RF power switch is preferably disposed between the controller and the scanning antenna system and between the controller and the donor antenna system. The controller is optionally connected to each RF power switch of the donor antenna system and the scanning antenna system by coaxial cables.

The RF power switch is further preferably disposed between the bidirectional amplifier and the one or more donor antennas, wherein the RF switch is connected to the controller and operates according to instructions received from the controller.

The controller is preferably configured to adjust operation of the RF power switch disposed between the controller and the donor antenna system so as to select operation of one of the directional antennas of the donor antenna system immediately following completion of a single sequencing pattern of operation of the scanning antenna system.

Preferably, the collected data comprises base station cell identification and received signal strength, and the pre-defined criteria preferably comprises signal strength, quality and available capacity.

The donor and scanning antenna systems may each comprise an antenna and an antenna azimuth alignment device configured to steer the antenna 360 degrees in the azimuth plane.

According to a second aspect of the invention, there is provided a method for operating a mobile vehicle antenna system, comprising receiving, for at least a first azimuth heading value and a second azimuth heading value, data comprising mobile communication signal and network parameters from a scanning antenna system; comparing the received data for the at least first azimuth heading value and the second azimuth heading value; determining whether the first azimuth heading value or the second azimuth heading value provides optimal network and signal parameters according to predefined criteria; controlling operation of a donor antenna in accordance with the determination.

According to a second aspect of the invention, there is provided a machine readable medium storing executable instructions that, when executed by a data processing system, cause the system to perform a method for operating a repeater antenna system for a vessel.

BRIEF DESCRIPTION OF THE DRAWINGS

A preferred embodiment of the invention will be described with reference to the appended drawings in which.

DETAILED DESCRIPTION

Figure 1:
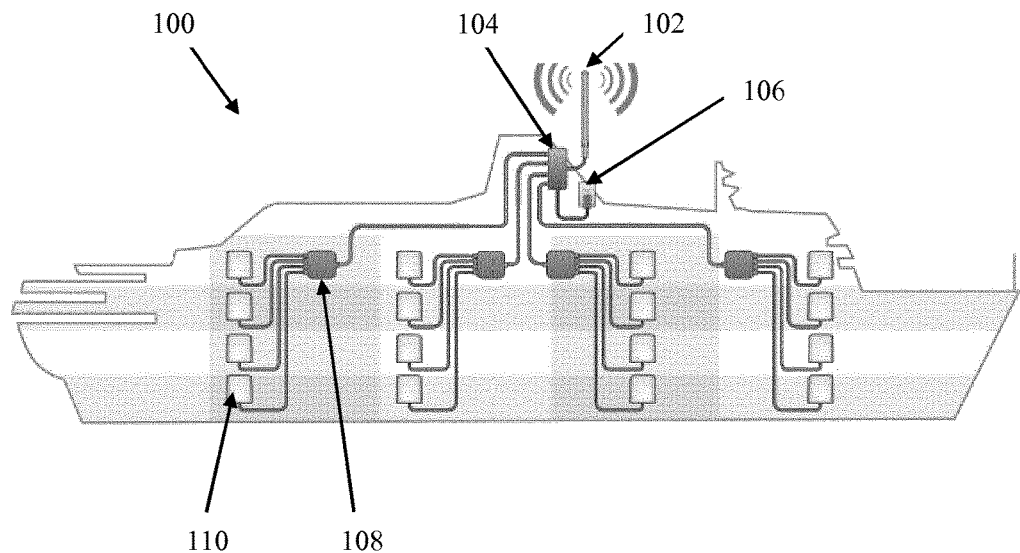
FIG. 1 is a schematic diagram of an antenna system components on a vessel.

FIG. 1 illustrates a prior art antenna system in a vessel. An outdoor omnidirectional antenna 102 is connected to a four-port repeater 104. The four-port repeater 104 is powered via power supply 106 and is connected to one or more line amplifiers 108 which in turn are connected to one or more panel internal antennas 110. The omnidirectional antenna 102 acts as a donor antenna which receive donor signal coverage from base station and tower signals from land. The signals are passed to the repeater 104 which amplifies the signals before they are split between line amplifiers 108. The line amplifiers 108 further amplifier the signals before they are split and passed to panel antenna 110 which are located internally in the vessel.

Figure 2A:
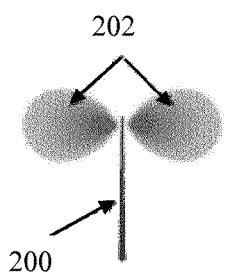
FIG. 2a is a side view of a radiation pattern of an omnidirectional antenna.
Figure 2B:
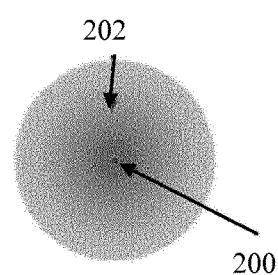
FIG. 2b is a top view of a radiation pattern of an omnidirectional antenna.

The torus-shaped radiation pattern 202 of an omnidirectional antenna 200, is shown in FIG. 2a (side view) and FIG. 2b (top view). Radial distance from the centre indicates the power radiated (which reaches a maximum in the horizontal, or azimuth plane and drops to zero directly above and below the antenna. Antenna 200 radiates power equally in all directions in the azimuth plane.

Figure 3:
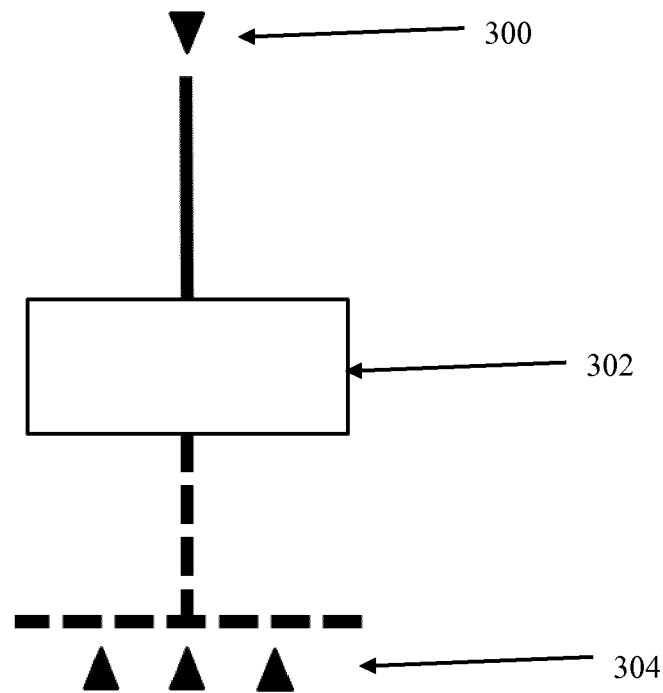
FIG. 3 is schematic diagram of an omnidirectional donor antenna system.

FIG. 3 shows an omnidirectional antenna 300, a bi-directional amplifier 302 and three rebroadcast panel antennas 304. The signals collected by omnidirectional antenna 302 are directed to the bi-directional amplifier for amplification and distribution to the rebroadcast antennas. Since the donor external is omnidirectional antenna, signals emanating from all azimuth directions (including background noise) will be collected passed to the bi-directional amplifier 302 and amplified equally. Existing bi-directional amplifiers are high-power and offer maximum gains of around 100 dB. However, signals from particular cellular towers cannot be filtered from the background noise, and as such a bi-directional amplifier of high gain will still fail to compensate for the low gain of the omnidirectional antenna.

Figure 4A:
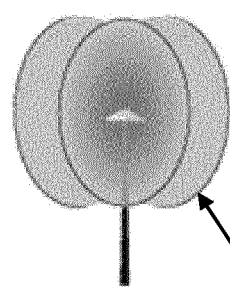
FIG. 4a is side view of a radiation pattern of a three-beam antenna.
Figure 4B:
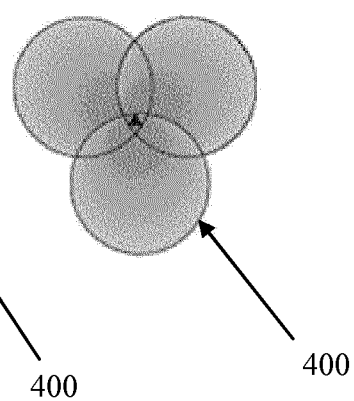
FIG. 4b is top view of a radiation pattern of a three-beam antenna.

The present invention utilises one or more directional antennas. An example of a radiation pattern 400 created by three equally spaced directional antennas is shown in FIG. 4a (side view) and FIG. 4b (top view). Although separate directional antennas used together are discussed, it will be appreciated that a single antenna have multiple directional beams or lobes can also be used. The radiation pattern 400 comprises three separate patterns, each occupying an azimuth range centred on the azimuth heading value of the directional beams of each of the three directional antennas. Although the radiation pattern of each antenna is identical in FIGS. 4a and 4b, the patterns could be different. The radiation pattern for each separate antenna beam of the 3-beam directional external antenna systems should have at least 3 dBi gain.

Figure 5:
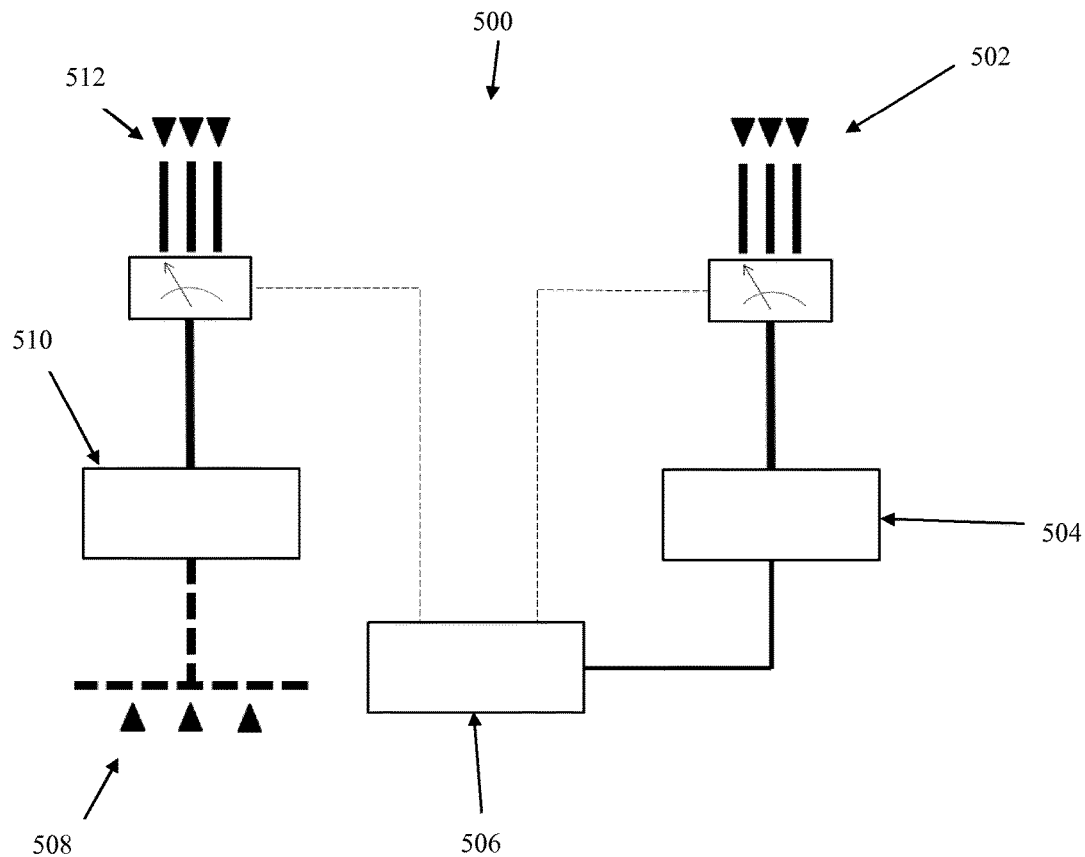
FIG. 5 is a schematic diagram of antenna system components according to an embodiment of the invention.

FIG. 5 shows, schematically, the components of an antenna system 500 of the present invention. System 500 comprises a scanning antenna system 502 comprising three directional scanning antennas or a multidirectional antenna having three beams) which is connected to an RF network scanning analyser 504. Both the RF network scanning analyser 504 and the scanning antenna system 502 are in communication with a controller 506. Controller 506 is also in communication with donor antenna system 512 which comprises three directional donor antennas (or a multidirectional antenna having three beams). The donor antenna system 512 is in communication with a bi-directional amplifier 510 which in turn is connected to three internal antennas 508.

Each of the scanning antennas in scanning antenna system 502 is positioned such that the azimuth heading (i.e. the direction of the main beam) is equally spaced from the azimuth heading of the other two antennas. Thus, for three scanning antennas or beams, the azimuth headings will be separated by 120 degrees. The scanning antennas are configured to receive data indicative of mobile communication signal and network parameters, which may comprise, for example, signal strength, available networks, coverage and capacity indicators, bandwidth, etc. The signals and networks data received are those from cellular tower transmitters and base station on the coastline or in nearby land.

Figure 6:
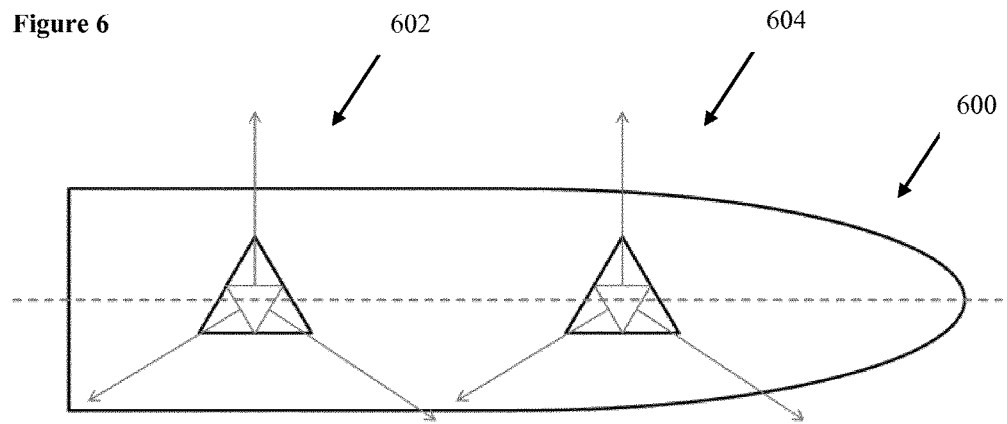
FIG. 6 is a schematic top view of scanning and donor antenna systems located on a vessel.

The direction of the main beam of each of the donor antennas/lobes in donor antenna system 512 are also equally spaced. In an embodiment where the number of scanning antenna/beams equals the number of donor antenna/beams, the azimuth heading directions of, for example, the first, second and third scanning antennas/beams is the same as the azimuth heading directions of the first, second and third donor antennas/beam—i.e. the two antenna systems are 'aligned' such that their respective antennas/beams are directed to the same azimuth value. This is shown in FIG. 6—scanning antenna system 602 is aligned with donor antenna system 604 on ship 600.

The signals donated by nearby cellular tower are automatically analyzed by the RF network scanning analyser 504 which determines, preferably, at least the Cell-Id and the received signal strength. As will be discussed further below, each of the scanning antennas (or beams of a multidirectional scanning antenna) operate according to a timed sequence pattern. The signal information is determined by the RF network scanning analyser 504. Information is passed from the RF network scanning analyser 504 to controller 506.

Controller 506 controls operation of the scanning antenna system 502 according to defined criteria, such that only one of the three scanning antennas/beams are operating and therefore receiving signal and network data at any one time. Operation of the scanning antenna system 502 is sequenced such that a first scanning antenna/beam is operating for a set time period, and, on expiry of the set time period, a second scanning antenna/beam is operational for the same set time period, and, on expiry of that time period, a third scanning antenna/beam is operational for the same set time period. The sequenced operation of the scanning antenna system 502 then begins again such that the sequenced operation is continuous.

Only a single feeding line per antenna/beam (for both the scanning and donor antenna systems) is required. Both the donor and scanning antenna system are connected to multiple individual coaxial cables each—one per antenna or beam. Power feed to each of the scanning antennas/beams is by a RF power switch circuitry (not shown, but disposed between the network analyser and the scanning antennas) comprising a timer. The timer of the switching circuitry is synchronized with the controller 506 such that the controller is able to 'match' information received from the RF network scanning analyser 504 to a particular scanning antenna/beam.

At the end of the first complete sequence pattern (i.e. after each of the three scanning antennas/beams has been operational for, for example, 20 seconds), the controller 506 analyses and compares the data received from the RF network scanning analyser 504 relating to the signals received from each antenna/beam to determine from which of the three antennas/beams the 'best' data was received. Determining which data is 'best' is based on predefined criteria. The criteria will depend on the specific circumstances of each implementation and the controller can be reconfigured accordingly. For example, the predefined criteria could comprise, solely, signal strength. The 'best' data will therefore be the strongest signal. The best data may be determine by an algorithm to take account of coverage, signal strength, available networks, etc.

Optimum donor signals for retransmission are those that satisfy minimum coverage and capacity requirements. Their maximum retransmission distance should be less than the technology allows (after adding radio propagation delays due to amplification and filtration). For example, a donor cell signal could be of better coverage at the location of retransmission interest but of limited capacity (i.e. the donor cell is serving high traffic on mainland hotspots). Such signals are generally undesirable for use in cellular repeater applications.

Once the best data (and the particular scanning antenna/beam which provided that best data) has been determined, the controller 506 controls operation of the donor antenna 512 based on the known direction of the scanning antenna which provided the best data. Three donor antennas/beams are depicted in FIG. 5. The azimuth heading value of each donor antenna is, similarly to the scanning antenna, equally separated from each of the other antenna by 120 degrees.

RF power switch circuitry is also connected to the donor antenna system 512, disposed between the bi-directional amplifier and the donor antennas. After the selection process is completed, controller 506 instructs the second RF power switch module to operate a donor antenna/beam which is equivalently orientated (in terms of azimuth heading value) to the scanning antenna/beam which provided the optimum donor signals (as determined by controller 506). The RF feeding to the bi-directional amplifier is changed accordingly. It will be appreciated that the analysis and determination by the controller 506 will occur while the second sequenced pattern is underway. At the end of every complete sequence of operation of the scanning antenna system 502 (e.g. after 60 seconds (20 seconds scanning for each scanning antenna/beam)), the controller determines the particular donor antenna/beam which is to be in operation until the current sequence of operation of the scanning antenna system 512 is complete (after which the controller 506 again determines which donor antenna/beam to switch on). In one embodiment, there may be a period of time (shorter than a complete sequence of operation of the scanning antenna system) immediately following the end of a complete sequence during which the earlier, existing donor antenna/beam is active as well as the new donor antenna/beam—i.e. there is an overlap in donor antenna/beam operation to facilitate base station handover.

In an alternative embodiment, the scanning antenna system and donor antenna system are combined by use of dual polarization antennas. In this configuration, a single triple-sector dual-polarization multi-band antenna system (such as, for example, a Galtronics Extent T5622 or a Kathrein 84010515/6 or similar), housed under a single radome, operates as both the scanning and donor antenna systems. Each antenna/sector has a dual polarisation (such that each antenna/sector operates as a pair of antennas) e.g. cross polarisation at +45 degrees and −45 degrees. A single polarisation acts as a single scanning or donor antenna. Each antenna/sector (i.e. each pair) has a donor and scanning feeding line (a coaxial cable). A controller therefore receives 6 feeding lines to RF ports of the controller. A high power RF switch PCB comprises the repeater system driver connection (while also serving as the physical connection to the donor antenna system). The controller controls operation of the scanning antennas in a similar manner to that described above.

The controller collects the received mobile signals from the scanning antenna systems, analyses and compares the information received from each scanning antenna (in real or near-real time) and outputs an operational instruction to the high power RF switch. The high power RF switch PCB connects the repeater system with the respective donor antenna system according to the determination (as discussed above), by the controller, of which scanning antenna provides optimal signals. Use of a dual polarisation antenna system saves space (particularly relevant on a vehicle) and cost.

In alternative embodiments, there may be more or less than three scanning antennas/beams. The higher the number of beams that can be provided from the multi-beam directional external antenna systems (donor and receiving) in the azimuth plane, the higher the retransmission gain (donor) and the positioning accuracy (receiving) of the donor cell tower signals.

Different RF power switch configurations, e.g. 1:4, 1:8, 1:16 RF power switch modules, for different time patterns, e.g. 5, 7, 9 seconds time periods and for different multi-beam directional external antenna receivers, e.g. four, eight, sixteen beams, may be employed.

A single directional scanning antenna may be re-positioned at set time intervals by a motorised azimuth alignment device in order to scan 360 degrees of the azimuth plane in a specified time period. A single directional donor antenna may also be re-positioned by a motorised azimuth alignment device in accordance with the controller determination regarding optimum received signals. In this embodiment, a motorised azimuth alignment device re-position the scanning antenna and/or the donor antenna, the antennas comprise a built-in GPS module. An azimuth alignment device, under control of the controller, steers the scanning and/or donor antenna 360° in the horizontal plane. The scanning antenna is re-adjusted at pre-defined time intervals by a pre-defined angle. The time intervals and extent of movement about the azimuth plane after each time interval will depend on the specific circumstances such as coverage, speed of movement, etc. Synchronisation of the antenna and controller timers and operation of the RF network analyser is similar to that discussed above. After the scanning antenna has collected signal information at equally spaced angles about the azimuth plane for a time period (preferably equal for each antenna) sufficient to collect a sufficient amount of data for the network analyser to analyse the signals, the controller determines the direction from which the optimal signals were received and instructs an azimuth alignment device to re-position the single directional donor antenna such that the direction of the main beam is the same as the direction of the main beam of the scanning antenna at which the optimum signals were received.

Both the scanning and donor azimuth alignment device have a build-in GPS module, a differential GPS module (D-GPS), and/or a gyroscopic compass such that the azimuth alignment device can accurately determine the direction of the antenna with respect to a particular reference, such as grid or true North.

The main beam azimuth direction of both the scanning and donor directional antennas are aligned initially (i.e. when installed) to the vessel's bow, or at a known offset from the bow. Preferably, the antenna is re-positioned with respect to the vessel's bow. Since the direction of the antenna with respect to North can be determined, and the initial position of the antenna with respect to the bow is known, it is possible to determine the direction of the antenna (when not in the initial position) relative to the bow (and therefore the direction of movement of the vessel). A build-in optical encoder and/or an electrical potentiometer module enable the azimuth alignment device to align the antenna relative to the vessel's direction of movement which in turn is relative to North.

Preferably, the azimuth alignment device is able to re-position the antenna heading by a maximum of 5° at any one time. Given the relative narrow vertical plane radiation of directional antennas, the relatively low movement speeds of vessels and relative high long between the ship and donor cell towers, the azimuth alignment device attached to the selected directional donor external antenna re-adjusts the donor antenna to a high accuracy. In some embodiments, a control system of the azimuth alignment device receives an antenna movement command from an external triggering module. A motor of the alignment device moves an antenna mounting bracket and locks the antenna bracket in the desired position.

Azimuth alignment devices are discussed in the applicant's prior published patent applications WO2013171291 and WO2013011002, the contents of which are hereby incorporated by reference where permitted.

A single directional scanning antenna may be used with a single directional donor antenna. A single directional scanning antenna could be used with a multidirectional donor antenna system comprising multiple antennas/beams and similarly a multidirectional scanning antenna system comprising one or more scanning antenna/beams could be used with a single directional donor antenna.

The present invention allows for an in-ship repeater system that adjusts a high gain directional donor antenna system dynamically based on real time measurements collected from a directional receiving external antenna system, in order to optimize radio link budgets and improve the in-ship network performance experienced by mobile devices serviced by the in-ship repeater system.

The invention claimed is:

1. A mobile vehicle repeater antenna system, comprising:
a scanning antenna system comprising one or more scanning antennas, wherein the one or more scanning antennas are configured to receive, for at least a first azimuth heading value and a second azimuth heading value, data comprising mobile communication signal and network parameters,
a donor antenna system comprising one or more antennas, wherein the one or more antennas are configured to receive and transmit mobile communication signals, wherein the donor antenna system is connected to a bi-directional amplifier,
a controller connected to the scanning antenna system and the bi-directional amplifier, wherein the controller is configured to
receive, process and compare the received mobile communication signals for the at least first azimuth heading value and the second azimuth heading value;

determine whether the first azimuth heading value or the second azimuth heading value provides optimal network and signal parameters according to predefined criteria; and control connectivity of the bi-directional amplifier with the one or more donor antennas of the donor antenna system in accordance with the determination;

wherein the donor antenna system and the scanning antenna system are comprised in a dual polarisation antenna system comprising two or more antennas, wherein each of the two or more antennas has a first polarisation and a second polarisation, and wherein the first polarisation of each of the two or more antennas operates as a scanning antenna and the second polarisation of each of the two or more antennas operates as a donor antenna.

2. The system of claim 1, wherein the first azimuth heading value and the second azimuth heading value are, respectively, heading values of two of the two or more antennas of the dual polarisation antenna system.

3. The system of claim 1, wherein the dual polarisation antenna system comprises first, second and third antennas, and wherein the main beam of the first, second and third antenna is positioned at 120, 240 and 360 degrees on the azimuth plane.

4. The system of claim 1, wherein the controller comprises a timer and the scanning antenna system comprises an RF power switch, wherein the RF power switch of the scanning antenna system is synchronised with the timer of the controller.

5. The system of claim 4, wherein the controller is further configured to control the scanning antenna system to collect data by sequencing operation of its directional antennas, wherein the sequenced operation of the antennas is controlled by the timer.

6. The system of claim 4, wherein the sequencing pattern dictates the length of the time periods during which data is collected for each antenna of the scanning antenna system.

7. The system of claim 6, wherein the time periods for collecting data are equal for each antenna in the scanning antenna system.

8. The system of claim 7, wherein the controller is configured to determine, based on the network and signal parameters received by each scanning antenna during a complete scanning sequence, which directional antenna of the donor antenna system is to be operational during the next scanning sequence.

9. The system of claim 1, wherein each of the one or more scanning antennas are concurrently operational and collecting data, and preferably wherein the controller periodically compares the data received from all of the one or more scanning antennas.

10. The system of claim 1, wherein the donor antenna system comprises one or more internal panel antennas.

11. The system of claim 1, further comprising an RF power switch disposed between the controller and the scanning antenna system.

12. The system of claim 11, wherein the controller is connected to the RF power switch of the scanning antenna system by coaxial cables.

13. The system of claim 1, further comprising an RF power switch disposed between the bidirectional amplifier and the one or more donor antennas, wherein the RF switch is connected to the controller and operates according to instructions received from the controller.

14. The system of claim 13, wherein the controller is configured to adjust operation of the RF power switch disposed between bidirectional amplifier and the one or more donor antennas so as to select operation of one of the directional antennas of the donor antenna system immediately following completion of operation of the scanning antenna system.

15. The system of claim 1, wherein the collected data comprises base station cell identification and received signal strength.

16. The system of claim 1, wherein the predefined criteria comprise signal coverage, quality and capacity indicators.

17. The system of claim 1, wherein the donor antenna system comprises an antenna and an antenna azimuth alignment device configured to steer the antenna 360 degrees in the azimuth plane.

18. The system of claim 1, wherein the scanning antenna system comprises an antenna and an antenna azimuth alignment device configured to steer the antenna 360 degrees in the azimuth plane.

19. A method for operating a mobile vehicle antenna system, comprising receiving, for at least a first azimuth heading value and a second azimuth heading value, data comprising mobile communication signal and network parameters from a scanning antenna system, wherein the scanning antenna system comprises in a dual polarisation antenna system comprising two or more antennas, wherein each of the two or more antennas has a first polarisation and a second polarisation, and wherein the first polarisation of each of the two or more antennas operates as a scanning antenna and the second polarisation of each of the two or more antennas operates as a donor antenna;

comparing the received data for the at least first azimuth heading value and the second azimuth heading value;

determining whether the first azimuth heading value or the second azimuth heading value provides optimal network and signal parameters according to predefined criteria;

controlling operation of a donor antenna of the dual polarization antenna system in accordance with the determination.

20. A non-transitory machine readable medium storing executable instructions that, when executed by a data processing system, cause the system to perform the method according to claim 19.

21. A mobile vehicle antenna system, comprising:

a scanning antenna system comprising one or more scanning antennas, wherein the one or more scanning antennas are configured to receive, for at least a first azimuth heading value and a second azimuth heading value, data comprising mobile communication signal and network parameters, a donor antenna system comprising one or more antennas, wherein the one or more antennas are configured to receive and transmit mobile communication signals, wherein the donor antenna system is connected to a bi-directional amplifier, a controller connected to the scanning antenna system and the bi-directional amplifier, wherein the controller is configured to receive, process and compare the received mobile communication signals for the at least first azimuth heading value and the second azimuth heading value;

determine whether the first azimuth heading value or the second azimuth heading value provides optimal network and signal parameters according to predefined criteria; and control connectivity of the bi-directional amplifier with the one or more donor antennas of the donor antenna system in accordance with the determination;

wherein the controller comprises a timer and the scanning antenna system comprises an RF power switch, wherein the RF power switch of the scanning antenna system is synchronised with the timer of the controller.

22. The system of claim 21, wherein the controller is further configured to control the scanning antenna system to collect data by sequencing operation of its directional antennas, wherein the sequenced operation of the antennas is controlled by the timer.

23. The system of claim 21, wherein the sequencing pattern dictates the length of the time periods during which data is collected for each antenna of the scanning antenna system.

24. The system of claim 23, wherein the time periods for collecting data are equal for each antenna in the scanning antenna system.

25. The system of claim 24, wherein the controller is configured to determine, based on the network and signal parameters received by each scanning antenna during a complete scanning sequence, which directional antenna of the donor antenna system is to be operational during the next scanning sequence.

* * * * *